United States Patent [19]

Ogino et al.

[11] 4,001,153

[45] Jan. 4, 1977

[54] UNSATURATED POLYESTER RESIN COMPOSITION

[75] Inventors: Akira Ogino, Osaka; Yoshikazu Nakai, Hyogo; Takeo Nakayama; Koji Miyamura, both of Osaka, all of Japan

[73] Assignee: Takeda Chemical Industries, Ltd., Japan

[22] Filed: Dec. 13, 1974

[21] Appl. No.: 532,640

[30] Foreign Application Priority Data

Dec. 14, 1973  Japan .............................. 48-140866

[52] U.S. Cl. ........................ 260/22 CB; 260/40 R; 427/29; 427/30; 427/185
[51] Int. Cl.² ......................................... C08G 63/48
[58] Field of Search ................... 260/22 CB, 75 UA

[56] References Cited

UNITED STATES PATENTS

| | | | |
|---|---|---|---|
| 2,757,160 | 7/1956 | Anderson | 260/22 CB |
| 2,919,254 | 12/1959 | Christenson et al. | 260/22 CB |
| 2,990,385 | 6/1961 | Schmutzler | 260/22 CB |
| 3,267,176 | 8/1966 | Mahlman | 260/22 CB |
| 3,530,202 | 9/1970 | Fekete et al. | 260/75 UA |
| 3,624,232 | 11/1971 | Van Dorp et al. | 427/185 |
| 3,629,169 | 12/1971 | Bedighian | 260/22 CB |
| 3,631,224 | 6/1970 | Baum | 260/75 UA |
| 3,662,025 | 5/1972 | Buck | 260/75 UA |
| 3,726,819 | 4/1973 | Dijkhuizen | 260/22 CB |
| 3,759,854 | 9/1973 | Chang et al. | 260/75 UA |

*Primary Examiner*—Ronald W. Griffin
*Attorney, Agent, or Firm*—Wenderoth, Lind & Ponack

[57] ABSTRACT

Finely powdered coating compositions comprising (1) an unsaturated polyester resin made up of (a) a polyol component containing not less than 30 mole percent of a glycol having cycloalkylene or phenylene group and (b) an unsaturated polycarboxylic acid component containing tetrahydrophthalic acid and/or a drying oil fatty acid, (2) a solid vinyl or allyl compound and (3) a curing catalyst, give coating layers which are very hard, tough and resistant to solvents by powder coating methods.

15 Claims, No Drawings

UNSATURATED POLYESTER RESIN COMPOSITION

This invention relates to air-drying unsaturated polyester resin compositions for powder coating applications.

Strong interest has developed in recent years toward the use of powder coatings as a replacement for conventional lacquers.

Initially, thermoplastic resins such as polyvinyl chloride, low density polyethylene, nylons and linear polyester are applied exclusively to the powder coating field, but the development of the electrostatic spray technique is now allowing thermosetting resins to challenge for a major share of the market.

Powder coatings are finely powdered compositions consisting of synthetic resins and additives such as pigments, fillers, stabilizers and hardners etc., and must have softening points that are sufficiently high to prevent caking or sintering.

In case of the use of thermosetting resins, uniform and reproducible curing characteristics and application properties must be maintained for at least the anticipated storage time of the powder coatings.

Thus, the thermosetting resins generally used for powder coatings are limited to epoxy resin, acrylic resin and melamine resin.

On the other hand, for imparting an air-drying characteristic to unsaturated polyester resins, there are known several methods, for example, the method wherein, in the manufacture of an unsaturated polyester resin, part of the acid component is replaced with tetrahydrophthalic acid (or its anhydride), the method in which the end groups of unsaturated polyesters are modified with drying oil fatty acids, and the method involving the use of allyl ether polyols as a polyol component. However, all the methods mentioned above make the polyester resins liquid. On account of their being liquids, these unsaturated polyester resins cannot be employed in powder coating applications. No powdery coatings can be made even by formulating these resins with solid cross-linking agents (e.g. solid vinyl or allyl compounds).

The present inventors have made an intensive research to make powder coatings liquid air-drying unsaturated polyester resins and unexpectedly found that the use of a polyol component containing not less than 30 mole percent of a glycol having cycloalkylene or phenylene group gives air-drying powder coatings. Thus, the powder coatings of the present invention comprise (1) an unsaturated polyester resin made up of (a) a polyol component containing not less than 30 mole percent of a glycol having cycloalkylene or phenylene group and (b) an unsaturated polycarboxylic acid component containing tetrahydrophthalic acid and/or a drying oil fatty acid, (2) a solid vinyl or allyl compound and (3) a catalyst.

The glycols having cycloalkylene group are, for example, cycloalkylenediols such as 1,2-cyclopentanediol, 1,3-cyclopentanediol, 1,4-cyclohexanediol, 1,3-cyclohexanediol, 1,2-cyclohexanediol, 4,4'-methylene-bis(cyclohexanol) and 4,4'-isopropylidene-bis(cyclohexanol), (hereinafter referred to as hydrogenated bisphenol A), and the bis(hydroxyalkyl) cyclohexanes, in which the alkyl is one-having 1 to 3 carbon atoms (e.g. methyl, ethyl, propyl, isopropyl) such as 1,3-bis(hydroxymethyl)cyclohexane and 1,3-bis(hydroxyethyl)cyclohexane.

These glycols may have one or more substituents such as halogen and alkyl group.

The glycols having phenylene group are ones which have such substituents on aromatic rings as hydroxyalkyl group (e.g. hydroxymethyl, hydroxyethyl and hydroxypropyl).

As such glycols, there may be mentioned, for instance, xylene glycol, bisphenol A-propylene oxide adducts, bisphenol A-ethylene oxide adducts, hydroquinone-propylene oxide adducts, hydroquinone-ethylene oxide adducts, etc.

Referring to propylene oxide or ethylene oxide adducts, the number of propylene or ethylene oxide units is preferably 2 to 3. These glycols may have one or more substituents such as halogen, alkyl group etc.

The above-mentioned glycol may also be used as mixtures of two or more of them.

The proportion of a glycol having cycloalkylene or phenylene groups is not less than about 30 mole percent and, preferably, about 50 to 100 mole percent, relative to the total amount of a polyol component.

As a polyol component other than glycols having cycloalkylene or phenylene group, there may be mentioned such glycols as, for example, ethylene glycol, propylene glycol, 1,3-butylene glycol, 1,4-butylene glycol, neopentyl glycol, diethylene glycol, etc. In addition to these glycols, there may be present small amounts of polyols such as glycerol, trimethylol propane, pentaerythritol, allyl ether polyols, for example, the mono- or diallyl ether of glycerol, the mono-or diallyl ether of trimethylolpropane, the mono-, di-, or triallyl ether of pentaerythritol, etc.

These glycols or polyols may also be used as their optional mixtures.

When the allyl ether polyols are used, the amount of them is about 10 to 70 mole percent and, preferably, about 30 to 50 mole percent relative to the entire polyol component.

As the unsaturated polycarboxylic acid, there may be mentioned such unsaturated dicarboxylic acids as fumaric acid, maleic acid, maleic anhydride and itaconic acid.

In the present invention, an unsaturated polycarboxylic acid is partially replaced with tetrahydrophthalic acid (or tetrahydrophthalic anhydride) and/or a drying oil fatty acid.

The drying oil fatty acid may, for example, be linoleic acid, linolenic acid, geranic acid, dehydrogeranic acid, sorbic acid, heptatri-1,3,5-ene-1-carboxylic acid, nonatetra-1,3,5,7-ene-1-carboxylic acid, eleostearic acid, etc.

These drying oil fatty acids may be used as pure products or as mixed fatty acid products containing a preponderance of them, such as soybeam oil fatty acid, linseed oil fatty acid, safflower oil fatty acid, etc.

The proportion of said tetrahydrophthalic acid (including tetrahydrophthalic anhydride), or drying oil fatty acid that is to be employed for said modification purposes may be as follows. Thus, the amount of tetrahydrophthalic acid is about 20 to 70 mole percent and, preferably, about 30 to 50 mole percent relative to the unsaturated polycarboxylic acid component. The proportion of drying oil fatty acid is about 1.5 to 10 mole percent and, preferably, about 2.5 to 7.5 mole percent relative to the unsaturated polycarboxylic acid component used.

The unsaturated polycarboxylic acid component may be modified with saturated polycarboxylic acids such as phthalic anhydride, isophthalic acid, terephthalic acid, chlorendic acid and trimellitic acid as far as the amount of the unsaturated dicarboxylic acid is not less than 30 mole % of the whole acid component. In general, the polyol component is employed in a ratio near molar with respect to the whole acid component, but may be considerably higher, e.g. 2 to 20%.

In working the present invention, all the materials may be charged into a reactor before the condensation reaction is started or, when said modification with drying oil fatty acid is carried out, one may first react all the materials but the drying oil fatty acid until a predetermined acid number is obtained and, then, reacting the product further with the drying oil fatty acid. In conducting the above condensation reaction, the ordinary conditions of manufacture of unsaturated polyesters are employed. Thus, the reaction is carried out at about 150° to 220° C for about 5 to 15 hours.

The air-drying unsaturated polyester resins thus produced are solids having softening points of about 50° to 150° C and, preferably, about 70° to 100° C, and their acid number is about 10 to about 40.

Such unsaturated polyester resins as above are cured with solid curing monomers in the presence of curing catalysts (or promoters). As the curing monomers used, there may be mentioned such vinyl or allyl compounds having melting points of about 50° to 100° C as acrylamide, methacrylamide, maleinimide, diallyl phthalate prepolymers, etc. The proportion of such vinyl or allyl compounds is about 15 to 70 percent and, preferably, about 20 to 50 percent relative to the weight of the air-drying unsaturated polyester resin.

A portion of such compound or compounds may be replaced with one or more nonvolatile liquid monomers such as diallyl phthalate.

As the curing catalyst (or promoter), use is made of an organic peroxide compound such as, for example, dicumyl peroxide, t-butyl peroxybenzoate, di-t-butyl peroxide, cumene hydroperoxide and benzoyl peroxide. The amount of such catalysts is about 0.1 to 5 weight percent and, preferably, about 0.5 to 3 weight percent of the combined weight of resin components and curing monomer. If necessary, there may further be incorporated a suitable filler such as calcium carbonate, colorant, leveling agent such as silicon oil, tetrafluoroethylene or polyacrylic acid and other additive.

The powder-coating composition is manufactured by premixing the above-mentioned resin components, curing monomer and catalyst (promoter), compounding the premix evenly in a melt-mixing equipment such as an extruder, Banbury mixer, hot-roll mill or the like, cooling the melt, pulverizing the resultant mass and sieving the powder to the mesh-size suited to the intended powder coatings, for instance about 10 to 300 μ.

Since the powder-coating composition thus obtained has the curing catalyst and curing monomer evenly dispersed in the resin, it can be applied easily to the substrate surface by a known coating method, for example the electrostatic powder coating method or the fluidized-bed coating method. And, usually, very satisfactory coats can be obtained by letting the composition to cure in a hot-air oven, for instance, at 150° to 250° C for 5 to 30 minutes. The powder-coating composition of the present invention yields an attractive coat with a flat, smooth surface and stability to solvents, for it contains no volatile matter at all, nor does it liberate volatile substances in the course of cure. Furthermore, this powder-coating material has a satisfactory pot-life, enjoys a complete freedom from the phenomenon of blocking (the condition in which the individual particles become tacky and get adhered to each other) and yields films that are tough and highly resistant to solvents.

For a further detailed explanation of the invention, the following examples and comparative examples are given, wherein the term "part(s)" means "part(s) by weight" unless otherwise specified.

EXAMPLE 1

A charge of 116 g. fumaric acid, 152 g. tetrahydrophthalic anhydride, 252 g. hydrogenated bisphenol A, 55 g. ethylene glycol and 58 mg. hydroquinone is condensed at 200° C for 6 hours to prepare an unsaturated polyester having an acid number of 25 and a softening point of 90°–93° C. This product is pulverized to a mesh size of 100 μ, a suitable particle size (A). Then, 70 parts of (A), 30 parts of diallyl phthalate prepolymer (melting point 90° C, approx.), 10 parts of titanium oxide and 1.0 part of dicumyl peroxide is mix-melted and, then, comminuted to a mesh size of 100 μ. This powdery composition is coated onto an iron sheet by means of an electrostatic coating equipment and heated at 190° C for 10 minutes. The properties of the resulting film are: pencil hardness: 4H; Erichsen test: not less than 8 mm: impact resistance (du Pont test) one-half inch, 500 g., 50 cm; cross-cut test: good; solvent resistance: satisfactory.

With the above formulation save tetrahydrophthalic anhydride or save hydrogenated bisphenol A, the resulting unsaturated polyester is a liquid and cannot be particulated.

EXAMPLE 2

A charge of 98 g. maleic anhydride, 148 g. phthalic anhydride, 336 g. hyrogenated bisphenol A, 52 g. ethylene glycol and 60 mg. hydroquinone is reacted for 6 hours until the acid number of the reaction product is 25. Then, 45 g. of linseed oil fatty acid is added and the mixture is further reacted for 2 hours. The procedure gives an unsaturated polyester (B) which has an acid number of 20 and a softening point of 85°–88° C. Then, 70 parts of (B), 30 parts of maleimide, 10 parts of titanium oxide and 1.0 part of di-t-butyl peroxide are mix-melted and, pulverized to a mesh size of not more than 100 microns.

A steel plate is previously heated to 200° C and immersed in a fluidized bed of the above powder. The coated plate is then heated to cure at 200° C for 5 minutes. The properties of the resulting film are: pencil hardness: 2 – 3H; Erichsen test: 8 mm pass; impact resistance (du Pont test) one-half inch, 500 g., 50 cm; cross-cut test: good; solvent resistance: good. The film produced from the above formulation save linseed oil fatty acid is poor in solvent resistance and unsuited to practical uses. The same composition as formulated as above less hydrogenated bisphenol A cannot be processed into a powdery coating.

EXAMPLE 3

A charge of 116 g. fumaric acid, 143 g. tetrahydrophthalic anhydride, 34 g. dehydrated castor oil fatty acid, 252 g. hydrogenated bisphenol A, 65 g. ethylene glycol and 60 mg. hydroquinone is reacted to obtain an unsaturated polyester (C) having an acid number of 25 and a softening point of 80°–83° C. Then, 75 parts of (C), 25 parts of methacrylamide, 15 parts of titanium oxide and 1 part of t-butyloxy benzoate are mix-melted and, then, pulverized to a mesh size of not more than 100 microns. The resulting powder is applied to a steel plate by means of an electrostatic coating equipment and heated to cure at 190° C for 10 minutes.

The properties of the resulting film are: pencil hardness: 4H; Erichsen test: 7 mm pass; impact resistance (du Pont test) one-half inch, 500 g., 40 cm; cross-cut test: good; solvent resistance: good.

(COMPARATIVE EXAMPLE)

A charge of 116 g. fumaric acid, 143 g. tetrahydrophthalic anhydride, 34 g. dehydrated castor oil fatty acid, 120 g. hydrogenated bisphenol A (25 mole % of the glycol component), 100 g. ethylene glycol and 55 mg. hydroquinone is reacted to obtain an unsaturated polyester having an acid number of 28 and a melting point of 45°–50° C. Then, 70 parts of this unsaturated polyester is mix-melted with 30 parts of diallyl phthalate-prepolymer, 20 parts of titanium oxide and 2 parts of dicumyl peroxide and the mixture is comminuted to a mesh size of not more than 100 microns. In this case, however, blocking takes place immediately, making it difficult to sieve the powder.

EXAMPLE 4

A charge of 116 g. fumaric acid, 148 g. phthalic ahydride, 110 g. α-glycerol monoallyl ether, 480 g. bisphenol A-propylene oxide adduct (2 moles P.O. added to bisphenol A) and 90 mg. hydroquinone is reacted to prepare an unsaturated polyester (D) having an acid number of 35 and a softening point of 88°–91° C. Then, 70 parts of (D), 30 parts of acrylamide, 10 parts of titanium oxide and 1 part of dicumyl peroxide are mix-melted and pulverized to a mesh size of not more than 200 microns. A steel plate is previously heated to 200° C and dipped into a fluidized bed of the above powder. The coated plate is further heated to cure in situ at 190° C for 10 minutes. The properties of the resulting film are: pencil hardness: 3H; Erichsen test, 8 mm: pass; impact resistance (du Pont test) one-half inch, 500 g., 50 cm; cross-cut test: good; solvent resistance: good.

EXAMPLE 5

A charge of 116 g. fumaric acid, 143 g. phthalic anhydride, 34 g. linoleic acid, 252 g. hydrogenated bisphenol A, 33 g. ethylene glycol, 70 g. α-glycerol monoallyl ether and 70 mg. hydroquinone is reacted to prepare an unsaturated polyester (E) having an acid number of 30 and a softening point of 83°–86° C.

Then, 70 parts of (E), 30 parts of acrylamide, 10 parts of titanium oxide and 1 part of dicumyl peroxide are mix-melted and pulverized to a mesh size of not more than 200 microns.

A steel plate is previously heated to 200° C and dipped into a fluidized bed of the above powder. The coated plate is further heated to cure in situ at 190° C for 10 minutes. The properties of the resulting film are: pencil hardness: 3H; Erichsen test, 8 mm pass; impact resistance (du Pont test) one-half inch, 500 g., 50 cm pass; cross-cut test: good; solvent resistance: good.

What is claimed is:

1. An air-drying unsaturated polyester resin composition for powder coating application comprising (1) a solid unsaturated polyester resin made up of (a) a polyol component containing not less than 30 mole percent of a glycol having cycloalkylene or phenylene groups and (b) an unsaturated polycarboxylic acid component containing (i) a drying oil fatty acid or (ii) tetrahydrophthalic acid and a drying oil fatty acid, (2) a solid vinyl or allyl compound and (3) a catalyst.

2. An air-drying unsaturated polyester resin composition as claimed in claim 1, wherein the polyol component contains about 10 to 70 mole percent of an allyl ether.

3. An air-drying unsaturated polyester resin composition as claimed in claim 1, wherein the amount of glycol having cycloalkylene or phenylene groups is about 50 to 100 mole percent of the polyol component.

4. An air-drying unsaturated polyester resin composition as claimed in claim 1, wherein the amount of drying oil fatty acid is about 1.5 to 10 mole percent of the unsaturated polycarboxylic acid component.

5. An air-drying unsaturated polyester resin composition as claimed in claim 1, wherein the amount of tetrahydrophthalic acid is about 20 to 70 mole percent of the unsaturated polycarboxylic acid component.

6. An air-drying unsaturated polyester resin composition as claimed in claim 1, wherein the softening point of the unsaturated polyester resin is about 50° to 150° C.

7. An air-drying unsaturated polyester resin composition as claimed in claim 1, wherein the glycol having cycloalkylene or phenylene groups is hydrogenated bisphenol A.

8. An air-drying unsaturated polyester resin composition as claimed in claim 1, wherein the drying oil fatty acid is linseed oil fatty acid.

9. An air-drying unsaturated polyester resin composition as claimed in claim 1, wherein the glycol having cycloalkylene or phenylene groups is bisphenol A-propylene oxide adduct.

10. An air-drying unsaturated polyester resin composition as claimed in claim 1, wherein the glycol having cycloalkylene or phenylene groups is hydrogenated bisphenol A, and the drying oil fatty acid is linoleic acid.

11. An air-drying unsaturated polyester resin composition as claimed in claim 1, wherein the vinyl or allyl compound is a diallyl phthalate prepolymer having a melting point of about 50° to 100° C.

12. An air-drying unsaturated polyester resin composition as claimed in claim 1, wherein the vinyl or allyl compound is maleinimide.

13. An air-drying unsaturated polyester resin composition as claimed in claim 1, wherein the vinyl or allyl compound is methacrylamide.

14. An air-drying unsaturated polyester resin composition as claimed in claim 1, wherein the vinyl or allyl compound is acrylamide.

15. An air-drying unsaturated polyester resin composition for powder coating application comprising (1) a solid unsaturated polyester resin comprising (a) a polyol component containing not less than 30 mole percent of a glycol having cycloalkylene or phenylene groups and (b) (i) an unsaturated polycarboxylic acid component containing about 20 to 70 mole percent of tetrahydrophthalic acid and about 1.5 to 10 mole percent of a drying oil fatty acid or (ii) an unsaturated polycarboxylic acid component containing about 1.5 to 10 mole percent of a drying oil fatty acid, (2) about 15 to 70 weight percent of a solid vinyl or allyl compound relative to the total resin composition and (3) about 0.1 to 5 weight percent of a catalyst relative to the total resin composition.

* * * * *